United States Patent [19]
Lilienthal, II et al.

[11] 3,780,558
[45] Dec. 25, 1973

[54] APPARATUS FOR STRAIGHTENING ELONGATED MEMBERS

[75] Inventors: Peter Frederick Lilienthal, II, Princeton; Karapurath Remachandran; Edward Stephen Tice, both of Hightstown, all of N.J.

[73] Assignee: Western Electric Company, Incorporated, New York, N.Y.

[22] Filed: Dec. 16, 1971

[21] Appl. No.: 208,849

[52] U.S. Cl............................ 72/98, 72/99, 72/101, 72/162
[51] Int. Cl............................................. B21d 3/02
[58] Field of Search .................. 72/95, 98, 99, 101, 72/162; 29/129.5, 148.4 D; 90/11 C

[56] References Cited
UNITED STATES PATENTS

| | | | |
|---|---|---|---|
| 2,655,194 | 10/1953 | Nilsson .................................. | 72/98 |
| 3,187,536 | 6/1965 | Zolton .................................... | 72/99 |
| 2,766,559 | 10/1956 | Pixley.................................... | 51/33 W |
| 2,642,763 | 6/1953 | Abramsen............................... | 72/99 |
| 3,129,639 | 4/1964 | Wadleck................................. | 90/11 |
| 3,370,491 | 2/1968 | Cross ...................................... | 90/11 |
| 3,465,641 | 9/1969 | Allison.................................... | 90/11 |

FOREIGN PATENTS OR APPLICATIONS

| | | | |
|---|---|---|---|
| 1,202,094 | 9/1965 | Germany.............................. | 90/11 C |

*Primary Examiner*—Milton S. Mehr
*Attorney*—Jack Schuman

[57] ABSTRACT

Tubular members, such as sections of tubing for use in millimeter waveguide systems, are straightened through the use of roller or rotary straightener apparatus. The previously common creation of helical indentations along the inner walls of the tubular members, which has been found to result from a discontinuous surface contact at discrete points between the tubular members and conventional straightening rollers, is avoided by the use of special-purpose rollers. The special-purpose rollers are shaped such that the tubular members undergoing straightening maintain intimate surface contact with the rollers throughout a continuous contact path extending along a substantial length of the surface of each roller.

Each special-purpose roller may be formed by positioning a cylindrical cutting tool, of a diameter equal to that of a tubular member to be roller straightened, at a selected acute angle to the axis of a roller blank and in contact with the roller blank, and then rotating both the cutting tool and the roller blank. Subsequent roller straightening will take place with each tubular member oriented at the selected acute angle to the finished roller.

Alternatively, a mathematical analysis may be employed to characterize the required roller shape. Numerically controlled machining techniques may then be utilized to form the special-purpose rollers in accordance with the determined shape.

2 Claims, 6 Drawing Figures

APPARATUS FOR STRAIGHTENING ELONGATED MEMBERS

BACKGROUND OF THE INVENTION

This invention relates to methods of straightening an elongated member and, more particularly, to methods of straightening a tubular member wherein the creation of localized deformations along the inner wall of the tubular member due to the straightening operation is substantially avoided.

In the art of manufacturing tubing, it is known to shape a blank into tubular form, for example, by deforming a flat, rolled metal strip and seam welding the deformed strip; to dimension the shaped tubing to a desired sized, for example, by drawing operations utilizing an external die and an internal mandrel; and to straighten the shaped and dimensioned tubing, typically through the use of conventional rotary straightening or roller straightening apparatus.

Roller straightening apparatus generally employed in the manufacture of tubing includes a number of rollers, for example, three pairs of rollers, which simultaneously rotate, axially advance and apply plastic bending stresses to sections of tubing undergoing straightening operations. A central pair of rollers is displaced laterally from a line joining the two other pairs to apply the plastic bending stresses to the tubing. The roller pairs squeeze and turn the tubing to provide the rotation and axial advance. The application of plastic bending stresses to a rotating section of tubing of imperfect straightness advancing through the rollers causes the section to spring back elastically into a straighter configuration after plastic deformation has taken place within the roller straightener apparatus. A number of passes through the apparatus may be employed to reduce the axial curvature of the section of tubing to an acceptable level.

Conventional roller straightener apparatus is adapted to perform straightening operations on tubing sections having a wide range of outer diameters. As a result, the general purpose rollers employed in such apparatus are contoured to provide an acceptable degree of surface contact with many different sizes of tubing. In order to roller straighten a section of tubing of any particular outer diameter, the tubular section is simply placed between the rollers of each roller pair and the rollers are pressed toward one another and maneuvered angularly until the apparent best fit between the contours of the roller and the surface of the section of tubing is achieved. Roller straightening then takes place, while roller pressure is maintained on the tubing.

With particular reference, now, to the art of manufacturing tubular members to be used as sections of waveguide tubing for transmitting waves of millimeter wavelength, a high degree of perfection in straightness must be combined with a high degree of smoothness and uniformity of the inner wall of a tubular member to provide an acceptable product. It has been found that conventional roller straightening apparatus, using the available general purpose rollers, has not been capable of producing straightened tubular members suitable for utilization in millimeter waveguide systems. Subsequent to the straightening of tubular members to an acceptable straightness condition utilizing the available rollers, helical indentations have been observed along the inner walls of the members. These helical indentations have been found to result from a failure of the rollers and the tubular members to mate perfectly at their surfaces during the straightening operation. Instead, one or more individual contact points are present, forming regions of highly concentrated stress application on the surface of the tubular members which result in the internal helical indentations. These deformities, being periodic in nature, ordinarily render the tubular members unacceptable for use as millimeter waveguide sections.

It has been determined that a continuous contact path, rather than contact at one or more points, between the roller and tubular member surfaces is necessary to assure the elimination of the undesirable helical indentations. The suggestion has been made that the continuous contact path condition might be achieved by utilizing rollers having hyperbolic contours. Analysis has proved, however, that a hyperbolically shaped roller will not provide a perfect mate between the roller and tubular member surfaces along a substantial axial length of the roller.

Clearly, it would be most advantageous in the manufacture of high-quality tubular members, such as for use in millimeter waveguide systems, to provide methods of roller straightening sections of tubing without forming helical indentations along the inner walls of the tubing, for example, through the manufacture and utilization of specially designed rollers achieving a continuous contact path with the tubing sections undergoing straightening. No such rollers are presently available in the art, nor is any method for their design and manufacture generally known.

SUMMARY OF THE INVENTION

An object of the invention resides in new and improved methods of straightening an elongated member, such as methods of straightening a tubular member whereby the creation of localized deformations along the inner wall of the tubular member due to the straightening operation is substantially avoided.

The invention contemplates the provision of a set of specially contoured rollers for straightening tubular members of a given outer diameter. Each roller has a surface configured such that a tubular member and the roller will engage each other during the straightening operation throughout a continuous contact path extending along a substantial length of the roller. It has been found that by utilizing straightening apparatus having rollers of this type, it is possible to produce tubular members of a high degree of straightness which do not exhibit the internal helical deformities characteristic of prior art methods.

One method for producing rollers having surface contours configured to provide the desired continuous contact path, in accordance with the principles of the invention, involves the use of a cylindrical cutting tool with an outer diameter equal to the given outer diameter of tubular members to be roller straightened. A roller blank is machined with the cutting tool by rotating both the tool and the blank while the tool engages the blank at an acute angle to the axis of the blank. Subsequent roller straightening operations will be performed with the same acute angle maintained between each tubular member to be straightened and the finished roller.

An alternative method for forming rollers of the desired configuration involves a mathematical analysis for characterizing the required shape of each completed roller. Numerically controlled machining techniques may be thereafter employed to manufacture the rollers in accordance with the determined shape.

DETAILED DESCRIPTION

Figure 1:
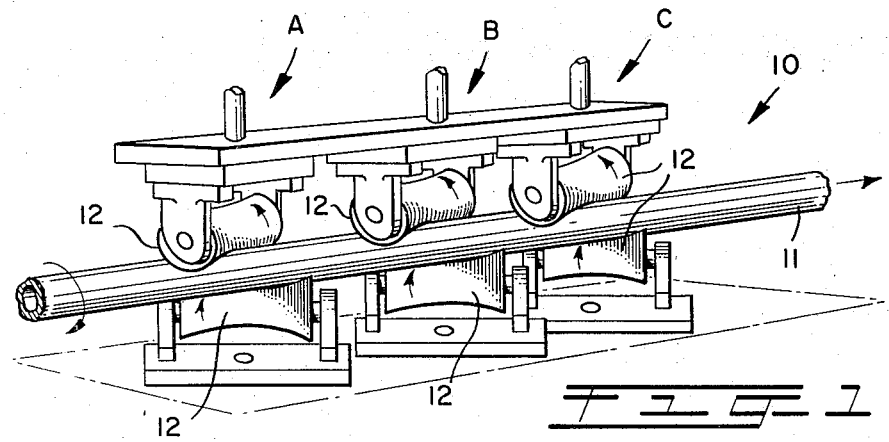
FIG. 1 of the drawing is an isometric view of conventional roller straightening apparatus, well known in the prior art.

Referring to FIG. 1 of the drawing, conventional roller straightening apparatus 10, well known in the prior art, is depicted. The apparatus, which may be employed to straighten an elongated rod or tubular member 11, includes a number of angularly disposed rollers 12. The rollers are grouped in pairs A, B, C, with one roller of each pair positioned opposite the other roller of the pair. Provision is made for relative motion between the rollers of each pair such that a tubular member, having any of a number of different possible outer diameters, may be inserted between the rollers and the rollers moved relatively together and/or angularly to grip the tubular member.

During the straightening of a bent tubular member, the end pairs of rollers A and C are typically disposed substantially in alignment with each other, with the central pair B offset, e.g., vertically, from the line joining the roller pairs A and C. Driven rotation of one or more of the rollers 12, typically driven rotation of all of the rollers, causes the bent tubular member 11 to rotate and to advance in the direction from roller pair A to roller pair C. As a section of the rotating tubular member passes from roller pair A to roller pair B, the section is subjected to bending stresses beyond the elastic limit of the tubing material. The plastic deformation which occurs in the vicinity of the central pair of rollers B during continued rotation of the tubular member is such as to cause the deformed section to spring back elastically into a straighter configuration than that previously present as the section passes from roller pair B to roller pair C.

Due to the fact that the prior art apparatus 10 is intended for use in straightening tubular members of various sizes, the rollers 12 of the pairs A, B, C are designed for gripping engagement with tubes having a wide range of outer diameters. When straightening a tubular member of any particular diameter, the general purpose rollers 12 of each pair A, B, and C are brought together and maneuvered angularly until an apparent best fit with the surface of the tubular member is obtained, and the roller straightening operation is then begun.

It has been observed that a helical deformation is present along an inner wall of tubular members straightened by conventional roller straightening apparatus such as that shown in FIG. 1. These helical deformations, which are of sufficient magnitude to render the tubular members unsuitable for use as sections of millimeter waveguide tubing, have been found to result from the presence of a single point of contact or a discontinuous plural point contact between the general purpose rollers 12 and each successive tubular member 11 undergoing straightening. Elimination of the internal helical deformation can be assured only through the presence of a continuous, intimate surface contact between a tubular member being straightened and a substantial length of each straightening roller 12, a condition which cannot be achieved utilizing the rollers of the prior art apparatus 10.

Figure 2:
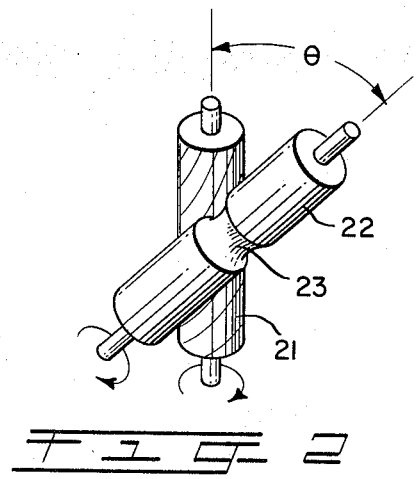
FIG. 2 is an isometric view illustrating a method of forming a roller in accordance with the principles of the invention, the roller being adapted for use in the prior art apparatus of FIG. 1 in order to provide a continuous contact path, along a substantial length of the roller, with a tubular member to be straightened by the apparatus.

Turning now to FIG. 2 of the drawing, there is illustrated a method of forming rollers for use in roller straightening apparatus, which rollers will provide the desired continuous contact path between the roller and tubular member surfaces during straightening. A cylindrical cutting tool 21 has an outer diameter equal to the outer diameter of a number of tubular members subsequently to be straightened through the use of a roller formed from a blank 22. The cutting tool is brought into engagement with the surface of the blank with the axis of the tool maintained at an acute angle $\theta$ to the axis of the blank. The cutting tool 21 and the roller blank 22 are then rotated about their respective axes such that a recessed area 23 is cut into the blank. A finished roller is produced which will maintain intimate contact over a substantial, continuous length of the roller with a tubular member of the same diameter as that of the cutting tool 21 when the tubular member is placed within the recessed area 23 oriented at the acute angle $\theta$ with respect to the finished roller. A different set of rollers may be fabricated for each particular size of tubular member to be straightened.

An alternative method is also available for forming rollers configured to provide an elongated, continuous path of contact with a tubular member. The alternative method involves a mathematical analysis of the contact between a roller, such as that produced by the method illustrated in FIG. 2, and a tubular member undergoing roller straightening.

Figure 3:
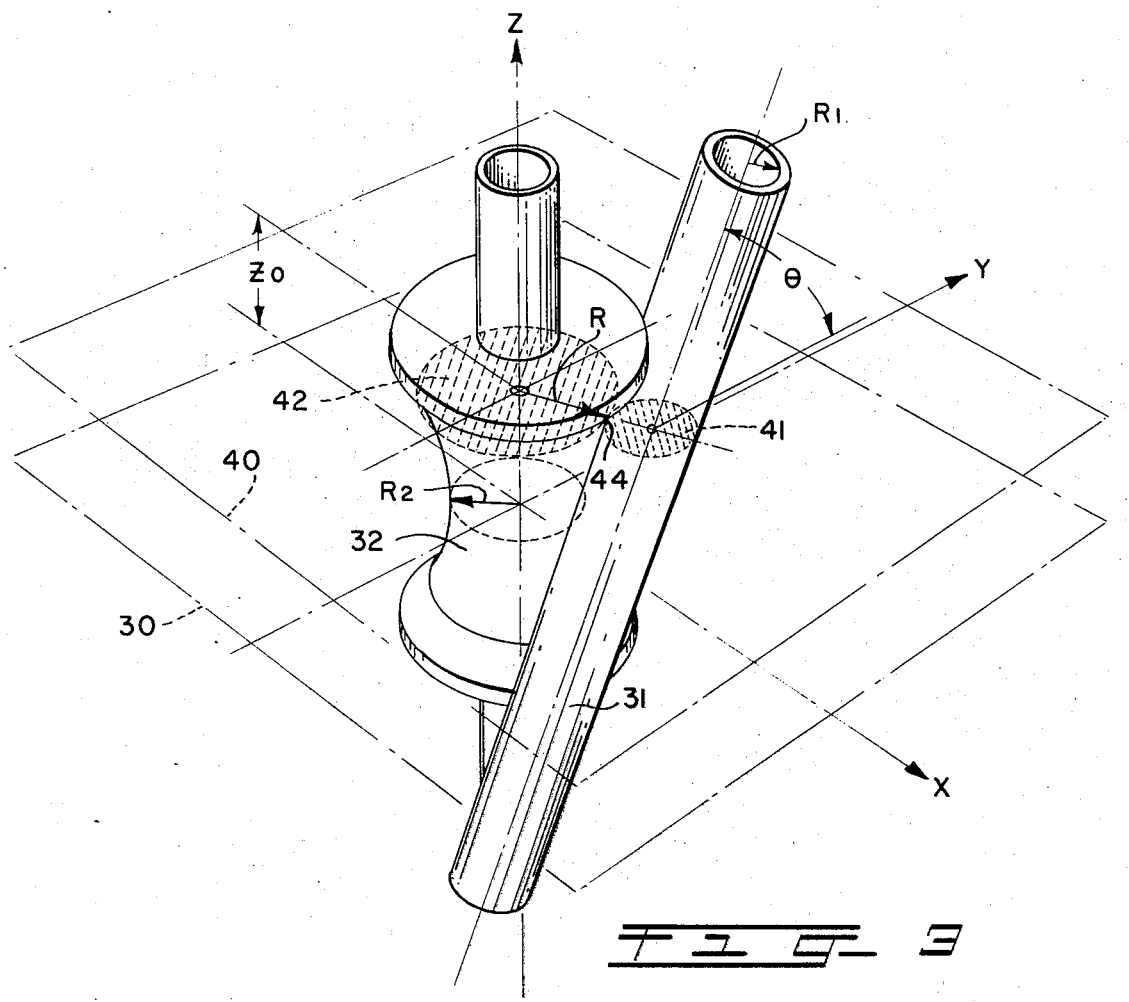
FIG. 3 is an isometric view of a model roller and tubular member structure, useful in analyzing the roller surface configuration required to provide a continuous contact path, along a substantial length of the roller, with a tubular member to be straightened.

With particular reference to FIG. 3 of the drawing, an imaginary central cutting plane 30 is passed through an elongated, continuous path of contact between a section of a tubular member 31 and a roller 32 having the desired surface configuration. The plane 30 intersects the roller axis perpendicularly at the longitudinal center of the roller. For ease in analysis, the section of the tubular member is treated as essentially straight. This approximation has been found experimentally to be quite sound, in that rollers produced according to the analytical method exhibit the desired elongated, continuous contact path with tubular members to be straightened, and in that such rollers permit straightening to occur without the production of objectionable helical indentations along the inner walls of the tubular members.

Figure 5:
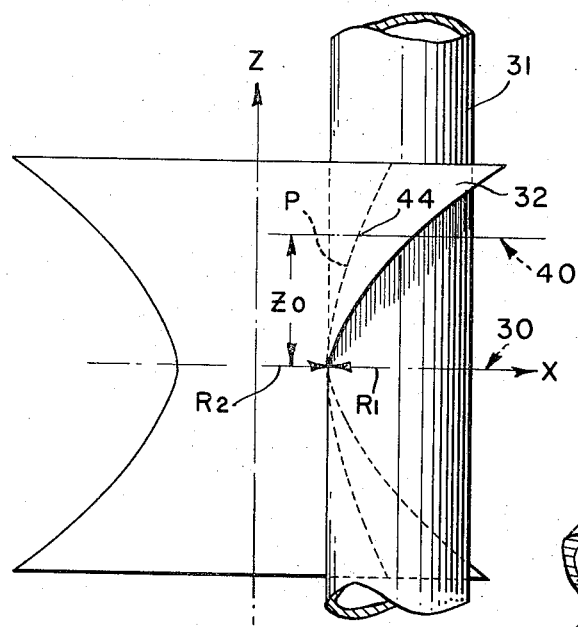
FIGS. 5 and 6 are elevational views of the roller and tubular member of FIG. 3, taken looking along a "Y" axis and an "X" axis, respectively, as defined in FIG. 3
Figure 6:
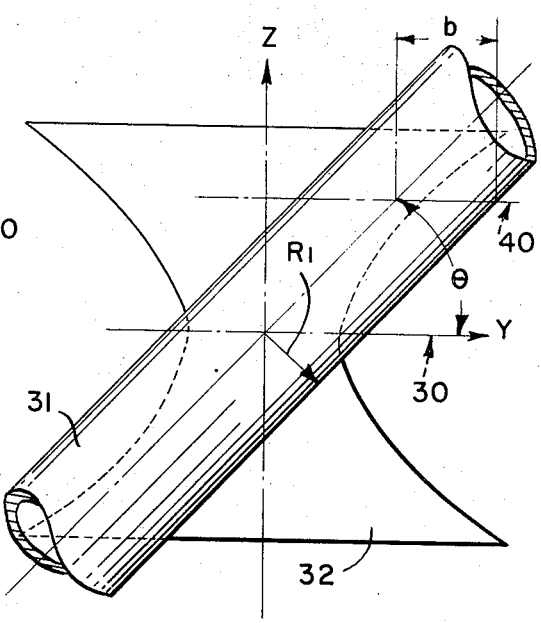

Three mutually perpendicular axes are illustrated in FIG. 3. A "Z" axis is coincident with the axis of the roller, while an "X" axis and a "Y" axis lie along the plane 30. The "Y" axis is selected such that the axis of the tubular member 31 is parallel to a plane which includes the "Y" and "Z" axes. FIGS. 5 and 6 show the engaged tubular member 31 and roller 32, looking, respectively, along the "Y" and "X" axes. The cross-sectional configurations 41, of the tubular member 31, and 42, of the roller 32, along another imaginary cutting plane 40 perpendicularly intersecting the "Z" axis at an arbitrary distance $z_o$ from the "X"-"Y" plane 30, are depicted isometrically in FIG. 3 and looking along the "Z" axis in FIG. 4.

Figure 4:
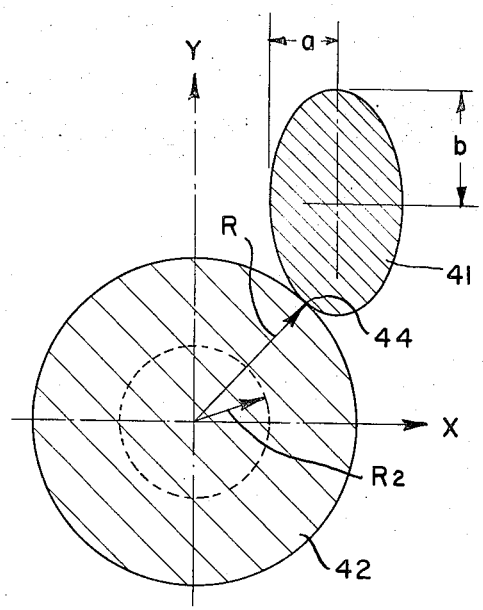
FIG. 4 is a cross sectional view of the roller and tubular member of FIG. 3 along a plane parallel to an "X"-"Y" plane depicted in FIG. 3.

An examination of FIG. 4 reveals that the tubular member 31 of FIG. 3 displays an elliptical cross section 41 in the imaginary cutting plane 40. The center of the ellipse is assigned the coordinates $x_o$, $Y_o$ and $z_o$. The roller 32 has a circular cross section 42 in the plane 40. The radius R is to be determined. A set of radius values for the roller corresponding to a sufficiently large set of imaginary cutting planes passed through the roller, perpendicularly to the axis of the roller, at varying positions along the roller axis will, of course, define the surface contour of the roller to such a degree that the roller may be produced by conventional methods of numerically controlled machining.

Since the axis of the tubular member 31 is parallel to the "Y"-"Z" plane (see FIG. 5), $$x_o = R_1 + R_2 \tag{1}$$

where $R_1$ is the radius of the tube 31 and $R_2$ is the radius of the cross section of the roller 32 in the central cutting plane 30 (see also FIG. 3).

Also (See FIGS. 3 and 6), $$y_o = z_o/\tan \theta \tag{2}$$

The equation of the circular cross section 42 (FIGS. 3 and 4) of the roller 32 in the cutting plane 40 at the height $z_o$ is $$x^2 + y^2 = R^2 \tag{3}$$

while the equation for the corresponding elliptical cross section 41 of the tubular member 31 is $$[(x - x_o)^2/a^2] + [(y - y_o)^2/b^2] = 1 \tag{4}$$

where $a = R_1$ (compare FIGS. 4 and 5), and $b = R_1/\sin \theta$ (compare FIGS. 4 and 6).

As may be seen in FIGS. 3 and 4, the cross sections 41 and 42 have a common tangent at a point 44 ($x, y, z_o$) where the plane 40 intersects an extended, continuous path of contact between the tubular member 31 and the roller 32. Thus, $$\left.\frac{dy}{dx}\right|_{x,y,z_0 \text{ circle 42}} = \left.\frac{dy}{dx}\right|_{x,y,z_0 \text{ ellipse 41}} \tag{5}$$

or $$x/y = [(x - x_o)b^2/(y - y_o)a^2] \tag{6}$$

which may be solved for $x$, yielding $$x = [x_o y b^2]/[y(b^2 - a^2) + y_o a^2] \tag{7}$$

By substituting Equation (7) into Equation (4), the equation for the elliptical cross section 41 (FIG. 4), and rearranging terms, $$x_o^2 a^2 \left[\frac{y - y_0}{y(b^2 - a^2) + y_0 a^2}\right]^2 + \frac{(y - y_0)^2}{b^2} = 1 \tag{8}$$

which can be expressed, as will be shown hereafter, in the more useful form $$Ay^4 + By^3 + Cy^2 + Dy + E = 0 \tag{9}$$

where
$A = \cot^4 \theta$
$B = 2y_o(\cot^2 \theta - \cot^4 \theta)$
$C = x_o^2/\sin^2 \theta + y_o^2 - 4y_o^2 \cot^2\theta + y_o^2\cot^4\theta - (R_1^2\cot^4\theta/\sin^2\theta)$
$D = -2x_o^2 y_o/\sin^2\theta - 2y_o^3 + 2y_o^3\cot^2\theta - (2R_1^2 y_o\cot^2\theta/\sin^2\theta)$
$E = (x_o^2 y_o^2/\sin^2\theta) + y_o^4 - (R_1^2 y_o^2/\sin^2\theta)$ The derivation of Equation (9) from Equation (8) proceeds as follows. Equation (8), $$x_o^2 a^2 [(y - y_o)/(y(b^2 - a^2) + y_o a^2)]^2 + [-y_o)^2/b^2] = 1$$

may be rewritten as $$(y-y_o)^2 \left\{ x_o^2 a^2 [1/y(b^2-a^2)+y_o a^2]^2 + 1/b^2 \right\} = 1 \tag{10}$$

or $$(y-y_o)^2 \left\{ x_o^2 a^2 b^2 + [y(b^2-a^2)+y_o a^2]^2 \right\}$$
$$= b^2 [y(b^2 - a^2) + y_o a^2]^2 \tag{11}$$

yielding
$(y^2-2y_o y+y_o^2)[x_o^2 a^2 b^2 + y^2(b^2-a^2)^2 + 2y_o y a^2(b^2-a^2) + y_o^2 a^4] = b^2[y^2(b^2-a^2)^2 + 2y_o y a^2(b^2-a^2) + y_o^2 a^4] \tag{12}$ Since $a = R_1$ and $b = R_1/\sin \theta$, $$(y^2 - 2y_0 y + y_0^2)\left[x_0^2 \frac{R_1^4}{\sin^2 \theta} + y^2\left(\frac{R_1^2}{\sin^2 \theta} - R_1^2\right)^2 \right.$$
$$\left. + 2y_0 y R_1^2\left(\frac{R_1^2}{\sin^2 \theta} - R_1^2\right) + y_0^2 R_1^4\right]$$
$$= \frac{R_1^2}{\sin^2 \theta}\left[y^2\left(\frac{R_1^2}{\sin^2 \theta} - R_1^2\right)^2 \right.$$
$$\left. + 2y_0 y R_1^2\left(\frac{R_1^2}{\sin^2 \theta} - R_1^2\right) + y_0^2 R_1^4\right] \tag{13}$$

Factoring out $R_1^4$ from both sides of the equation, $$(y^2 - 2y_0 y + y_0^2) R_1^4 \left[ \frac{x_0^2}{\sin^2 \theta} + y^2 \left( \frac{1}{\sin^2 \theta} - 1 \right)^2 \right.$$
$$\left. + 2y_0 y \left( \frac{1}{\sin^2 \theta} - 1 \right) + y_0^2 \right]$$
$$= \frac{R_1^6}{\sin^2 \theta} \left[ y^2 \left( \frac{1}{\sin^2 \theta} - 1 \right)^2 + 2y_0 y \left( \frac{1}{\sin^2 \theta} - 1 \right) + y_0^2 \right]$$

(14)

Since $$\left( \frac{1}{\sin^2 \theta} - 1 \right) = \csc^2 \theta - 1 = \cot^2 \theta:$$

$$(y^2 - 2y_0 y + y_0^2) \left[ \frac{x_0^2}{\sin^2 \theta} + y^2 \cot^4 \theta + 2y_0 y \cot^2 \theta + y_0^2 \right]$$
$$= \frac{R_1^2}{\sin^2 \theta} [y^2 \cot^4 \theta + 2y_0 y \cot^2 \theta + y_0^2]$$

(15)

or $$\left( \frac{x_0^2}{\sin^2 \theta} \right) y^2 + (\cot^4 \theta) y^4 + (2y_0 \cot^2 \theta) y^3 + (y_0^2) y^2$$
$$- \left( 2 \frac{x_0^2}{\sin^2 \theta} y_0 \right) y - (2y_0 \cot^4 \theta) y^3 - (4y_0^2 \cot^2 \theta) y^2$$
$$- (2y_0^3) y + \left( \frac{x_0^2 y_0^2}{\sin^2 \theta} \right) + (y_0^2 \cot^4 \theta) y^2 + (2y_0^3 \cot^2 \theta) y$$
$$+ (y_0^4) - \left( \frac{R_1^2}{\sin^2 \theta} \cot^4 \theta \right) y^2 - \left( 2 \frac{R_1^2}{\sin^2 \theta} y_0 \cot^2 \theta \right) y$$
$$- \left( \frac{R_1^2}{\sin^2 \theta} y_0^2 \right) = 0$$

(16)

By collecting terms, Equation (16) can be rewritten in the form of Equation (9), as follows:

$[\cot^4 \theta] y^4 + [2y_0 \cot^2 \theta - 2y_0 \cot^4 \theta] y^3$
$+ [x_0^2/\sin^2 \theta + y_0^2 - 4y_0^2 \cot^2 \theta + y_0^2 \cot^4 \theta - R_1^2/\sin^2 \theta \cot^4 \theta] y^2$
$+ [-2 \quad x_0^2/\sin^2 \theta y_0 - 2y_0^3 + 2y_0^3 \cot^2 \theta - 2 R_1^2/\sin^2 \theta y_0 \cot^2 \theta] y$
$+ [x_0^2 y_0^2/\sin^2 \theta + y_0^4 - (R_1^2/\sin^2 \theta) y_0^2] = 0$ (17)

or $$Ay^4 + By^3 + Cy^2 + Dy + E = 0$$

where
$A = \cot^4 \theta$
$B = 2y_0 (\cot^2 2\theta - \cot^4 \theta)$
$C = x_0^2/\sin^2 \theta + y_0^2 - 4y_0^2 \cot^2 \theta + y_0^2 \cot^4 \theta - (R_1^2 \cot^4 \theta)/\sin^2 \theta$
$D = -2x_0^2 y_0/\sin^2 \theta - 2y_0^3 + 2y_0^3 \cot^2 \theta - (2R_1^2 y_0 \cot^2 \theta)/\sin^2 \theta$
$E = x_0^2 y_0^2/\sin^2 \theta + y_0^4 - R_1^2 y_0^2/\sin^2 \theta$ Equation (9) is in a form which can readily be solved for the value of $y$ at the point of tangency 44 between the elliptical and circular cross sections 41 and 42, respectively. The equation yields four roots, two of which are real and two of which are complex. Of the two real roots, the one closest to the origin $(x,y,z = 0)$ is the $y$ value at the point of tangency 44. The coresponding x value may be found from Equation (4), the equation of the elliptical cross section, rearranged as follows:

$$x = x_0 - a \sqrt{1 - (y - y_0/b)^2}$$

(18)

The three coordinates, $x$, $y$, $z_0$, at the point of tangency 44 are now known. The radius R may be found from Equation (3), the equation of the circular cross section, rearranged as follows:

$$R = \sqrt{x^2 + y^2}$$

(19)

This procedure can be repeated for many selected values of $z$ in order to characterize the shape of a roller 32 which will provide maximum contact with a tube 31 of a given diameter ($2R_1$) disposed at the desired angle of orientation $\theta$ with respect to the roller of a given minimum radius $R_2$.

For the purpose of simplifying the forming of a roller having a shape determined in the manner just described, it is preferred to utilize conventional computer equipment. A computer is programmed, in accordance with standard programming techniques, to provide a set of radius values, R, corresponding to a series of incrementally spaced points along the axis of the roller, i.e., the Z axis, for a tubular member of each given outer diameter of interest. A number of numerical control tapes, one for each given tubular member diameter to be roller straightened, may be generated from the set of radius values so derived. The tapes may be employed in known manner to manufacture the desired rollers with commercially available, numerically controlled machining apparatus. Alternatively, templates may be generated, the templates having contours from which rollers may be formed by using commercial tracing apparatus such as a tracer lathe or a tracer grinder.

The length of the path of contact P (FIG. 5) between a tubular member and a roller so formed can be determined by computing the distance between any two successive points of tangency and summing the computed distances from the midpoint of the roller surface, $x = R_2$, $y = 0$, $z = 0$, to the last investigated point, $x$, $y$, $z$, using the equation for the distance $S_{L\,2-1}$ between any two adjacent points 1 and 2, $$S_{L\,2-1} = \sqrt{(x_2 - x_1)^2 + (y_2 - y_1)^2 + (z_2 - z_1)^2}$$

(20)

Sets of rollers, formed by numerically controlled machining apparatus as indicated above, have been employed in straightening tubular members of varying outer diameters, utilizing commercially available roller straightening apparatus of the type depicted in FIG. 1 of the drawing. The rollers of each set were oriented in pairs, in the manner shown in FIG. 1, defining a path of travel interconnecting the pairs of rollers along the central axis of each roller pair. Each roller was disposed tangentially to the path of travel at the previously selected acute angle $\theta$, thereby forming the acute angle $\theta$ with each successive tubular member advanced along the path of travel during straightening. The tubular members were observed to exhibit intimate contact with the surfaces of the rollers throughout a continuous contact path extending along a substantial length of the roller surfaces. Moreover, the straightened tubular members were characterized by a very high degree of straightness without any formation of undesirable helical deformations along the inner walls of the member.

It is to be understood that the above-described methods are simply illustrative of certain embodiments of the invention. An additional embodiment might involve the roller straightening of cylindrical rods, rather than tubular members. Further, by solving Equation (9) and utilizing the one of the two real roots which is more distant from the origin ($x$, $y$, $z = 0$), corresponding to a point on the elliptical section 41 diametrically opposite to the point 44 shown in FIG. 4, an annular roller may be designed with an internal surface which might be employed in roller straightening a tubular or cylindrical member, e.g., in cooperation with a second roller internal to the member. Numerous other modifications may be made without departing from the invention.

What I claim is:

1. In a method of straightening a length of stock material, which stock material has a cylindrical outer periphery of radius $R_1$, the steps of:

selectively positioning a set of rollers, each roller having an axially varying radius, the radius $R$ at any point along the roller depending on the axial distance $z_o$ of the point from the axial center of the roller in accordance with the formula $$R = \sqrt{x^2 + y^2}$$

where $y$ is a real root of the equation $$Ay^4 + By^3 + Cy^2 + Dy + E = 0$$

where
$A = \cot^4\theta$
$B = 2y_o(\cot^2\theta - \cot^4\theta)$
$C = x_o^2/\sin^2\theta + y_o^2 - 4y_o^2\cot^2\theta + y_o^2\cot^4\theta - (R_1^2\cot^4\theta)/\sin^2\theta$
$D = -(2x_o^2y_o)/\sin^2\theta - 2y_o^3 + 2y_o^3\cot^2\theta - [(2R_1^2y_o/\sin^2\theta]\cot^2\theta$
$E = (x_o^2y_o^2)/\sin^2\theta + y_o^4 - R_1^2y_o^2/\sin^2\theta$
and where
$\theta$ is an acute angle
$x_o = R_1 + R_2$
$y_o = z_o/\tan\theta$
$R_2$ is a minimum radius selected for the roller and where $$x = x_0 - R_1\sqrt{1 - \left[\frac{(y-y_0)^2 \sin^2\theta}{R_1^2}\right]},$$

the rollers being positioned to define a path of travel for advancing and straightening the length of stock material with the length of stock material engaging the surface of each roller at the acute angle $\theta$ to the axis of each roller; and feeding the length of stock material along said path of travel in contact with the rollers at the acute angle $\theta$ with rotation of the rollers and of the length of stock material.

2. In a method as set forth in claim 1, utilizing three pairs of rollers, said steps of selectively positioning a set of rollers and feeding the length of stock material comprising:

orienting the rollers of each pair in juxtaposition to one another with each roller of each pair pivoted in an opposite sense away from a central axis of the pair of rollers at an angle to said central axis equal to said acute angle; while also orienting the pairs of rollers with two of the pairs of rollers having colinear central axes, and with the third pair of rollers positioned intermediate the other two pairs of rollers and having its central axis spaced laterally from the line of the central axes of the other two pairs of rollers, a path interconnecting the three pairs of rollers along the central axis of each pair of rollers constituting said path of travel;

locating the length of stock material running along said path of travel through the three pairs of rollers; and rotatingly driving at least one of the pairs of rollers to feed the length of stock material along said path of travel through the three pairs of rollers, while rotating the length of stock material, so as to straighten the length of stock material.

* * * * *

UNITED STATES PATENT OFFICE
CERTIFICATE OF CORRECTION

Patent No. 3,780,558  Dated December 25, 1973

Inventor(s) P. F. Lilienthal, II et al.

It is certified that error appears in the above-identified patent and that said Letters Patent are hereby corrected as shown below:

Title page, column 1, "Karapurath Remachandran" should read --Karapurath Ramachandran--.

In the specification, Column 5, line 18, "$x_o$, $Y_o$ and $z_o$" should read --$x_o$, $y_o$ and $z_o$--. Column 6, lines 28 and 29, the equation should read $$-- C = \frac{x_o^2}{\sin^2\theta} + y_o^2 - 4y_o^2\cot^2\theta + y_o^2\cot^4\theta - \frac{R_1^2\cot^4\theta}{\sin^2\theta} --;$$

line 36, the equation should read $$-- x_o^2 a^2 \left[ \frac{y - y_o}{y(b^2 - a^2) + y_o a^2} \right]^2 + \frac{(y - y_o)^2}{b^2} = 1 --.$$

Column 7, line 43, the equation should read $$-- + \left[ \frac{x_o^2 y_o^2}{\sin^2\theta} + y_o^4 - \frac{R_1^2}{\sin^2\theta} y_o^2 \right] = 0 --;$$

lines 52-56, the equations should read $$-- C = \frac{x_o^2}{\sin^2\theta} + y_o^2 - 4y_o^2\cot^2\theta + y_o^2\cot^4\theta - \frac{R_1^2\cot^4\theta}{\sin^2\theta}$$

$$D = -\frac{2x_o^2 y_o}{\sin^2\theta} - 2y_o^3 + 2y_o^3\cot^2\theta - \frac{2R_1^2 y_o\cot^2\theta}{\sin^2\theta}$$

UNITED STATES PATENT OFFICE
CERTIFICATE OF CORRECTION

Patent No. 3,780,558  Dated December 25, 1973

Inventor(s) P. F. Lilienthal, II et al.   Page - 2

It is certified that error appears in the above-identified patent and that said Letters Patent are hereby corrected as shown below:

$$E = \frac{x_o^2 y_o^2}{\sin^2\theta} + y_o^4 - \frac{R_1^2 y_o^2}{\sin^2\theta} --.$$

Column 9, line 11, "moditications" should read --modifications--.

In the claims, Column 9, lines 30-34, the equations should read $$--C = \frac{x_o^2}{\sin^2\theta} + y_o^2 - 4y_o^2\cot^2\theta + y_o^2\cot^4\theta - \frac{R_1^2 \cot^4\theta}{\sin^2\theta}$$

$$D = -\frac{2x_o^2 y_o}{\sin^2\theta} - 2y_o^3 + 2y_o^3\cot^2\theta - \frac{2R_1^2 y_o}{\sin^2\theta}\cot^2\theta$$

$$E = \frac{x_o^2 y_o^2}{\sin^2\theta} + y_o^4 - \frac{R_1^2 y_o^2}{\sin^2\theta} --.$$

Signed and sealed this 22nd day of October 1974.

(SEAL)
Attest:

McCOY M. GIBSON JR.
Attesting Officer

C. MARSHALL DANN
Commissioner of Patents